Dec. 5, 1950 — R. SPIEGEL — 2,533,148
ROTARY HYDRAULIC COUPLING
Filed Nov. 1, 1945 — 2 Sheets-Sheet 1

Inventor
ROBERT SPIEGEL
By Clarence A. O'Brien
and Harvey B. Jacobson
Attorneys

Dec. 5, 1950      R. SPIEGEL      2,533,148
ROTARY HYDRAULIC COUPLING
Filed Nov. 1, 1945      2 Sheets-Sheet 2
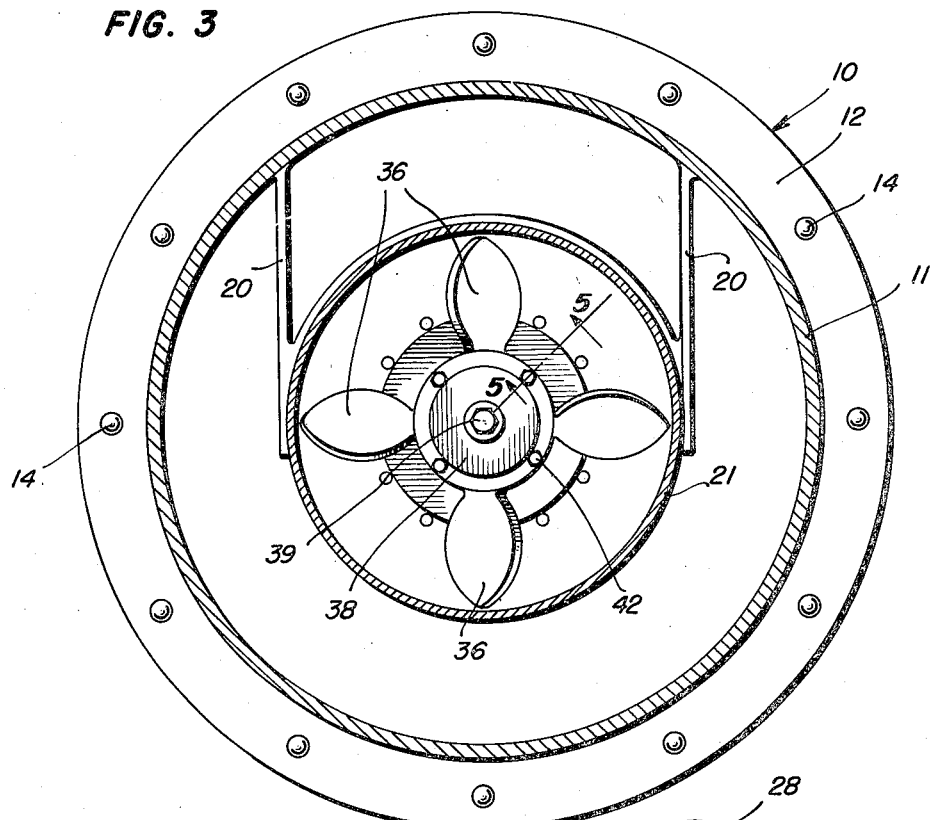
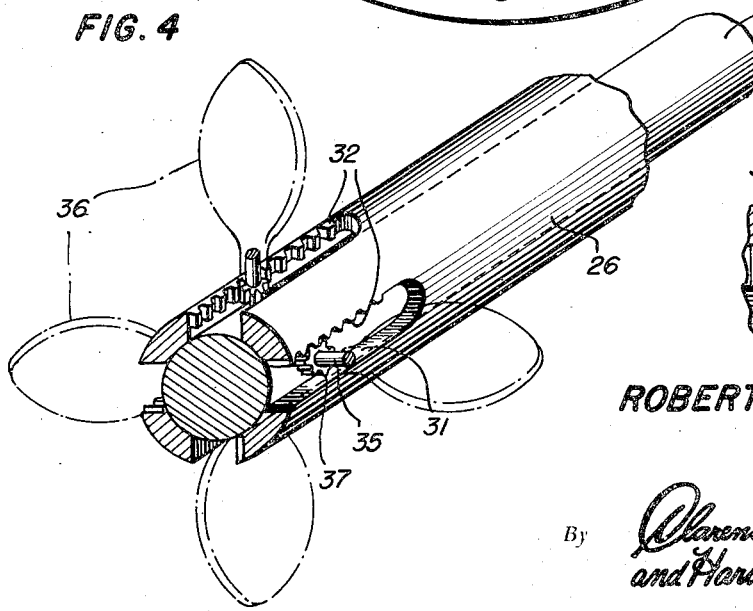
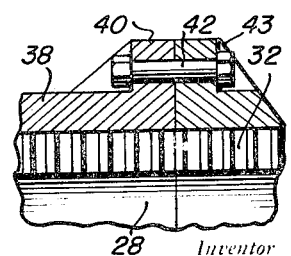
Inventor
ROBERT SPIEGEL Patented Dec. 5, 1950

2,533,148

UNITED STATES PATENT OFFICE 2,533,148

ROTARY HYDRAULIC COUPLING

Robert Spiegel, Formoso, Kans.

Application November 1, 1945, Serial No. 626,100

2 Claims. (Cl. 60—54)

This invention relates to a fluid transmission and has for its primary object to produce an infinite number of variations in the speed which may be transmitted to a driven shaft, even to the point of reversing the direction of rotation of a driven shaft.

Among its features my invention embodies creating a flow of non-compressible fluid through a constricted passage, a driven shaft in axial alignment with said passage and means on the shaft against which the fluid flowing through the passage will react to cause the driven shaft to be rotated.

Other features include a fluid tight casing adapted to be filled with a non-compressible fluid, a tubular body supported within the casing and forming a constricted passage, a drive shaft entering the casing in axial alignment with the constricted passage, means on the drive shaft and operable within the constricted passage for creating a flow of fluid through the constricted passage, a driven shaft entering the casing in axial alignment with the drive shaft and runner blades on the driven shaft against which the fluid flowing through the constricted passage reacts to impart rotary motion to the driven shaft.

Other features include means for regulating the pitch of the runner blades on the driven shaft by which the speed and direction of rotation of the driven shaft may be governed.

In the drawings:

Figure 3 is a transverse sectional view taken substantially on the line 3—3 of Figure 1;

Figure 4 is a fragmentary perspective view of the driven shaft showing the adjustable runner blades and the sleeve by which their pitch may be regulated and Figure 5 is a fragmentary sectional view taken substantially on the line 5—5 of Figure 3.

Figure 1:
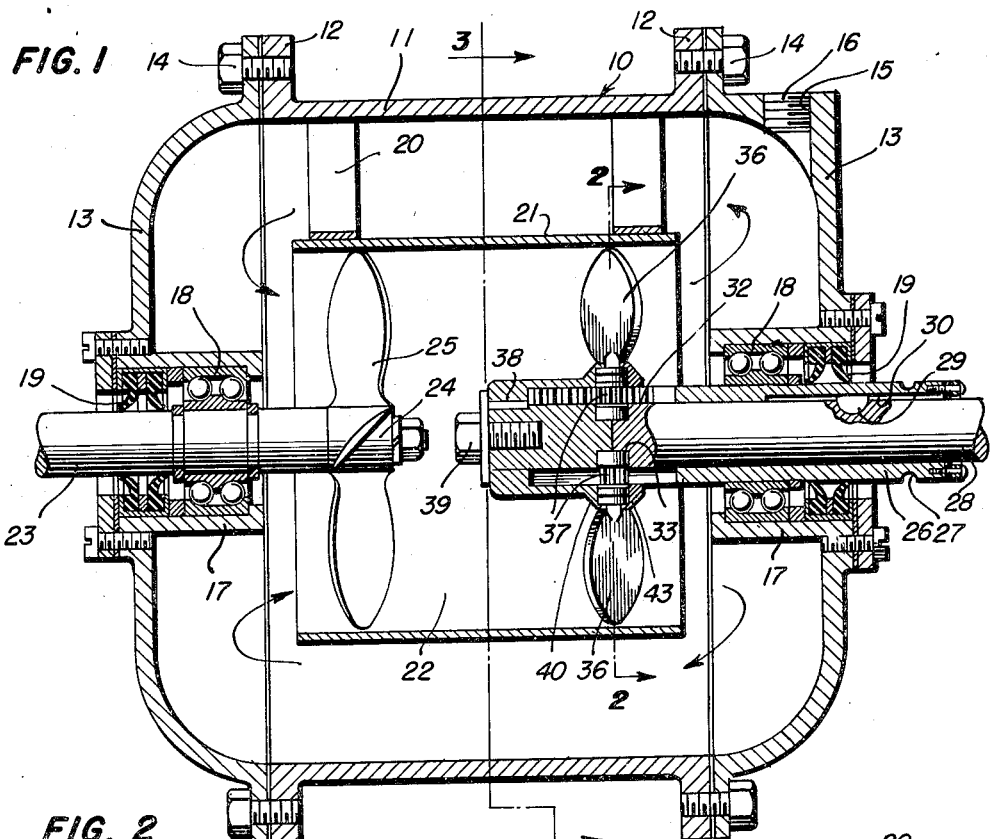
Figure 1 is a longitudinal sectional view through a transmission embodying the features of this invention.
Figure 2:
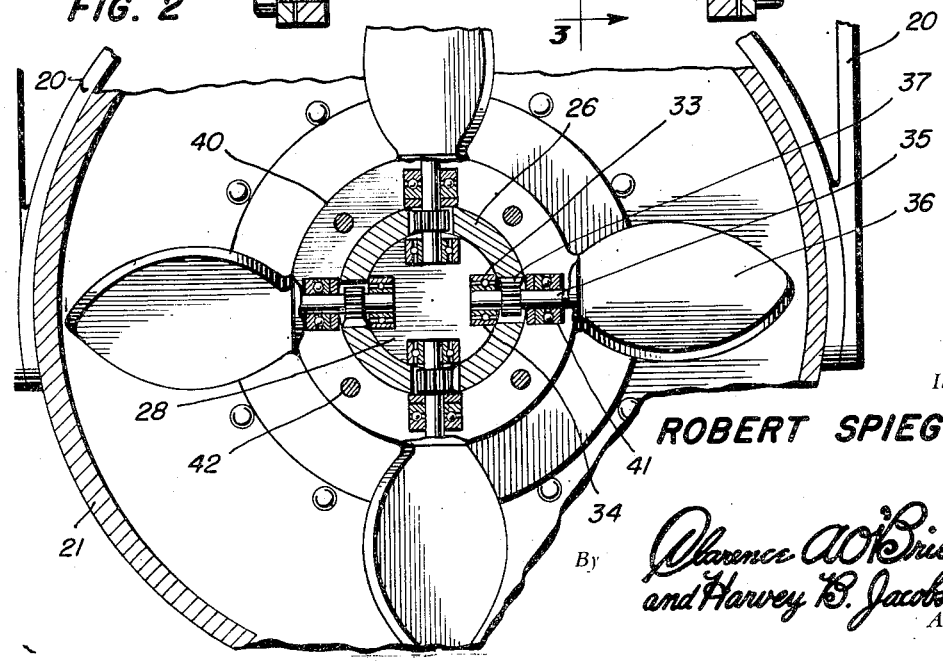
Figure 2 is a transverse sectional view taken substantially on the line 2—2 of Figure 1.

Referring to the drawings, in detail, a transmission designated generally 10 comprises a housing composed of a hollow cylindrical body 11 having flanges 12 at opposite ends to which cover plates 13 are attached by suitable bolts 14. One of the cover plates 13 is provided with a filling passage 15 which is adapted to be closed by a plug 16 and both plates 13 are provided with inwardly extending bosses 17 in which anti-friction bearings 18 are supported. Oil seals 19 are also carried by the cover plates 13 adjacent the outer ends of the boses 17 in order to form a fluid tight joint with the drive and driven shafts to be hereinafter more fully described.

Suspended on suitable brackets 20 within the tubular body 11 is a hollow cylinder 21 forming a constricted passage 22 which aligns axially with the anti-friction bearings 18.

Entering through one end of the casing and the fluid tight packing 19 carried thereby is a drive shaft 23 which is mounted to rotate in the anti-friction bearing 18 in the end plate 13 through which the shaft 23 extends. Secured to the inner end of the drive shaft 23 is an impeller 24 having constant pitch blades 25 which are operable within the passage 22 so that when the drive shaft 23 is rotated the fluid contained within the transmission case will be caused to move longitudinally through the constricted passage as indicated by the arrows in Figure 1 of the drawings.

Mounted for rotation in the anti-friction bearing at the opposite end of the transmission case is a sleeve 26 which is provided adjacent its outer end with a groove 27 by which it may be shifted longitudinally within the bearing 18 and packing 19. A driven shaft 28 extends longitudinally through the sleeve 26 and is held against relative rotation with relation thereto by means of a suitable key 29 which is operable in a suitable key way 30 formed in the sleeve as will be readily understood upon reference to Figure 1. Formed adjacent the inner end of the sleeve 26 are longitudinal slots 31, each of which is formed along one side wall with rack teeth 32. Formed in the shaft 28 near its innermost end are radial sockets 33 in which suitable anti-friction bearings 34 are seated. These bearings 34 support the inner ends of radially extending shafts 35 carrying at their outer ends runner blades 36 and intermediate their ends pinions 37 which, when the device is assembled, mesh with the rack teeth 32 so as the sleeve 26 moves longitudinally of the shaft the radial shafts 35 will be caused to rotate and vary the pitch of the blades 36.

In order to support the portions of the shafts 35 which extend beyond the periphery of the sleeve 26, I provide a cap 38 which is adapted to be fastened on the end of the shaft 28 by means of a bolt 39 and this cap is provided adjacent the end opposite that which is fastened to the shaft 28 with an outwardly extending flange 40. This flange is provided at spaced intervals with recesses into which anti-friction thrust bearings 41 are seated. Attached as by bolts 42 to the flange 40 is a retaining ring 43 which, like the flange 40, is provided with spaced recesses in which the other halves of the anti-friction bearings 41 seat. These anti-friction bearings 41 are of the thrust type so that when the shaft 28 is rotated, the radial shafts 35 will not be held from rotation through the influence of centrifugal force.

In operation it will be understood that when the impeller 24 is set in motion by rotation of the shaft 23, the fluid contained within the housing 10 will be circulated through the unit as suggested by the arrows in Figure 1. Due to the confinement of the flow of the fluid by the constricted passage 22 it will be caused to react against the runner blades 36 so as to rotate the shaft 28. The speed and direction of rotation of the shaft 28 may be governed by shifting the sleeve 27 longitudinally on the shaft 28 which will cause the pinions 37 meshing with the rack teeth 32 to rotate the radial shafts 35 and consequently adjust the position of the blades 36. Due to the infinite number of positions which the blades 36 may be made to take by movement of the sleeve 26 it is obvious that an infinite number of speeds, both forward and reverse, may be imparted to the shaft 28 according to the desires of the user. It will be understood, of course, that by sliding the sleeve 26 longitudinally of the shaft 27, the rack teeth 32 meshing with the pinions 37 will cause the radial shafts 35 to rotate in the bearings 34 and 41 to alter the position of the blades 36.

While in the foregoing there has been shown and described the preferred embodiment of this invention it is to be understood that minor changes in the details of construction, combination, and arrangement of parts may be resorted to without departing from the spirit and scope of the invention as claimed.

I claim:
1. In a variable speed transmission, a casing, axially aligned anti-friction bearings mounted in opposite end walls of said casing, a drive shaft extending through one of said bearings into the casing, constant pitch impeller blades mounted on the drive shaft and extending radially therefrom within the casing, a sleeve extending through the other anti-friction bearing into the casing, said sleeve being movable longitudinally in said bearing and having circumferentially spaced elongated longitudinal slots opening through the end thereof within the casing, longitudinally spaced teeth along one side wall of each slot, a driven shaft entering the casing through the sleeve, circumferentially spaced radially extending runner blades mounted in the driven shaft adjacent the inner end thereof, said last named runner blades projecting through the slots in the sleeve and being rotatable about their longitudinal axes, a spur gear on each of said last mentioned runner blades having meshing engagement with the teeth along the side wall of the slot through which the respective blade extends, an open ended cylinder supported within the casing in spaced relation thereto, said cylinder being concentric with the shafts and in substantial contact with the periphery of the impeller and runner blades and means on the exterior of the casing to shift the sleeve longitudinally and rotate the runner blades on their axes, thereby to alter the pitch thereof.

2. The combination of claim 1, including a thimble carried at the inner end of the driven shaft slidably embracing the inner end of the sleeve, a retaining ring slidably disposed on the sleeve, said thimble and ring having complementary recesses forming sockets therebetween, anti-friction thrust bearings seated in said sockets and engaging the runner blades, and fastening means detachably securing the thimble and the ring.

ROBERT SPIEGEL.

REFERENCES CITED

The following references are of record in the file of this patent:

UNITED STATES PATENTS

| Number | Name | Date |
|---|---|---|
| 1,953,458 | Bauer et al. | Apr. 3, 1934 |
| 1,993,741 | Jandasek | Mar. 12, 1935 |
| 2,357,654 | Horton | Sept. 5, 1944 |
| 2,368,279 | Wemp | Jan. 30, 1945 |
| 2,389,174 | Whitworth | Nov. 20, 1945 |